US012756325B2

(12) United States Patent
Almutairi

(10) Patent No.: US 12,756,325 B2
(45) Date of Patent: Oct. 6, 2026

(54) STEP DOWN THE VOLTAGE IN THE TRANSMISSION LINES USING CAPACITORS AND HIGH FREQUENCY SWITCHES

(71) Applicant: SAUDI ARABIAN OIL COMPANY, Dhahran (SA)

(72) Inventor: Abdulmalik Muteb Almutairi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 177 days.

(21) Appl. No.: 18/671,791

(22) Filed: May 22, 2024

(65) Prior Publication Data

US 2025/0364917 A1 Nov. 27, 2025

(51) Int. Cl.
*H02M 5/293* (2006.01)

(52) U.S. Cl.
CPC .................................. *H02M 5/2932* (2021.05)

(58) Field of Classification Search
CPC ............. H02M 5/2932; H02M 1/0095; H02M 1/4291; H02M 1/425
See application file for complete search history.

(56) References Cited

U.S. PATENT DOCUMENTS 5,570,279 A * 10/1996 Venkataramanan .. H02M 5/458 363/127
6,326,772 B2 * 12/2001 Kusumoto ............ H02M 3/155 323/356
9,516,723 B2 * 12/2016 Mao ........................ H05B 45/14

FOREIGN PATENT DOCUMENTS

CA 2200573 A1 * 3/1996 ............ H02M 5/458
CN 106208726 A * 12/2016 ................ H02J 3/12
WO WO-2017024995 A1 * 2/2017 ............ H02M 5/293

OTHER PUBLICATIONS

Machine translation (Year: 2016).*
Machine translation WO_2017024995_A1 (Year: 2017).*
A.K. Chattopadhyay, 18—ACâAC Converters, Muhammad H. Rashid, Power Electronics Handbook (Third Edition), Butterworth-Heinemann, 2011, pp. 487-521, (Year: 2011).*
L. Rahmani , F. Krim & A. Bouafia (2004): Deadbeat Control for PWM AC Chopper, Electric Power Components and Systems, 32:5, 453-466 (Year: 2004).*
Inderjit Singh Dhanjal Publication title âFilter Circuitsâ, 2017 (Inderjit) (Year: 2017).*

* cited by examiner

*Primary Examiner* — Thienvu V Tran
*Assistant Examiner* — Yahveh Comas Torres
(74) *Attorney, Agent, or Firm* — Vorys, Sater, Seymour and Pease LLP

(57) ABSTRACT

A circuit for stepping down an alternating current (AC) voltage from an input voltage to an output voltage. The circuit includes an input configured to couple to a voltage source for providing the input voltage as an AC signal to the circuit. The circuit also includes a first and a second capacitor in parallel with the input and an output. The circuit further includes a first and a second inductor in series with the input and the output. Additionally, the circuit includes a first switch in series with the input and the output and a second switch, wherein the output voltage of the circuit provided to the output is an AC signal that is less than or equal to the input AC signal based on a duty cycle of the first switch.

8 Claims, 3 Drawing Sheets

STEP DOWN THE VOLTAGE IN THE TRANSMISSION LINES USING CAPACITORS AND HIGH FREQUENCY SWITCHES

FIELD OF THE DISCLOSURE

The present disclosure relates generally to power transformation and, more particularly, to stepping down the voltage in an AC-AC converter.

BACKGROUND OF THE DISCLOSURE

A transformer is a passive component that transfers electrical energy from one electrical circuit to another circuit, or multiple circuits. A varying current in any coil of the transformer produces a varying magnetic flux in the transformer's core, which induces a varying electromotive force (EMF) across any other coils wound around the same core. Electrical energy can be transferred between separate coils without a metallic (conductive) connection between the two circuits. Faraday's law of induction, discovered in 1831, describes the induced voltage effect in any coil due to a changing magnetic flux encircled by the coil.

Transformers are used to change AC voltage levels, such transformers being termed step-up or step-down type to increase or decrease voltage level, respectively. Transformers can also be used to provide galvanic isolation between circuits as well as to couple stages of signal-processing circuits. Since the invention of the first constant-potential transformer in 1885, transformers have become essential for the transmission, distribution, and utilization of alternating current electric power. A wide range of transformer designs is encountered in electronic and electric power applications. Transformers range in size from RF transformers less than a cubic centimeter in volume, to units weighing hundreds of tons used to interconnect the power grid.

An ideal transformer is linear, lossless and perfectly coupled. Perfect coupling implies infinitely high core magnetic permeability and winding inductance and zero net magnetomotive force (i.e. $i_p h_p - i_s n_s = 0$). A varying current in the transformer's primary winding creates a varying magnetic flux in the transformer core, which is also encircled by the secondary winding. This varying flux at the secondary winding induces a varying electromotive force or voltage in the secondary winding. This electromagnetic induction phenomenon is the basis of transformer action and, in accordance with Lenz's law, the secondary current so produced creates a flux equal and opposite to that produced by the primary winding. A practical transformer's physical behavior may be represented by an equivalent circuit model, which can incorporate an ideal transformer.

Switching converters or switched-mode DC-to-DC converters store input energy temporarily and then release that energy to the output at a different voltage, which may be higher or lower. The storage may be in either magnetic field storage components (inductors, transformers) or electric field storage components (capacitors). This conversion method can increase or decrease voltage. Although they require few components, switching converters are electronically complex. Like all high-frequency circuits, their components must be carefully specified and physically arranged to achieve stable operation and to keep switching noise (EMI/RFI) at acceptable levels. Their cost is higher than linear regulators in voltage-dropping applications, but their cost has been decreasing with advances in chip design.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a circuit for stepping down an alternating current (AC) voltage from an input voltage to an output voltage includes an input configured to couple to a voltage source for providing the input voltage as an AC signal to the circuit. The circuit further includes a first and a second capacitor in parallel with the input and an output. The circuit also includes a first and a second inductor in series with the input and the output. Additionally, the circuit includes a first switch in series with the input and the output and a second switch, such that the output voltage of the circuit provided to the output is an AC signal that is less than or equal to the input AC signal based on a duty cycle of the first switch.

In another embodiment, a circuit for stepping down an alternating current (AC) voltage includes a first input having a negative terminal coupled to a ground pin and a positive terminal coupled to a first terminal of a first inductor. The first input is configured to couple to a voltage source for providing input voltage as an AC signal to the circuit. The circuit also includes a first switch having a first terminal coupled to a second terminal of the first inductor and a second terminal coupled to a first node. The circuit further includes a second switch having a first terminal coupled to the first node and a second terminal coupled to the ground pin. Furthermore, the circuit includes a second inductor having a first terminal coupled to the first node and a second terminal coupled to a second node. Further still, the circuit includes a second capacitor having a first terminal coupled to the second node and a second terminal coupled to the ground pin. Additionally, the circuit includes a positive output terminal coupled to the second node, as well as a negative output terminal coupled to the ground pin.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
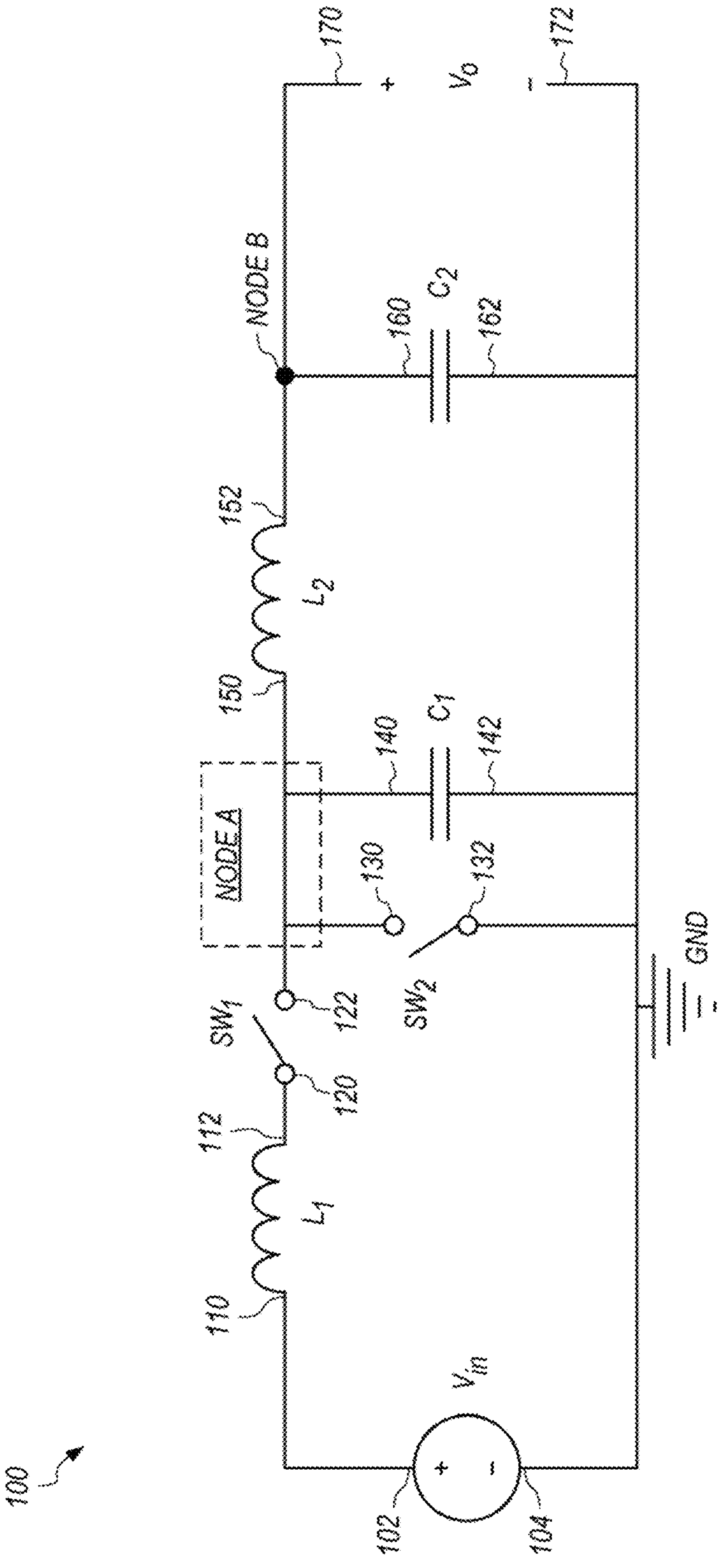
FIG. 1 is an example circuit for AC-AC electric power transformation.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to power transformation, and more particularly, to stepping down the voltage in an AC-AC converter. Specifically, alternating current (AC) is stepped down by employing principles of DC-DC converters in an AC circuit. The principles of DC-DC conversion that are employed to step down the AC include switches, such as thyristors. The circuit can be constructed with the switches and existing elements of a power system, such as transmission lines and protective capacitors (e.g., surge capacitors). Accordingly, the circuit provides the ability to step down AC voltage without using a traditional transformer, but includes other existing elements of a power system.

Specifically, the AC-AC converter can employ switches with relatively higher frequency than an input AC signal provided to the converter. For example, the switches can be thyristors selected to be capable of switching at a frequency of 10 kilohertz (kHz). In combination with the selected inductors and capacitors, the converter can provide an output voltage less than or equal to the input voltage by controlling the switches, the output voltage having the same frequency as the input voltage. Specifically, a duty cycle associated with switches can be over one hundred times faster than a cycle of the input AC signal. Therefore, the input AC voltage can be stepped down by the AC converter to a lower output AC signal without using traditional transformers. Rather, the AC converter can employ selected switches and components that are more efficient and less costly compared to traditional transformers, thereby improving efficacy and improving voltage regulation compared to existing systems.

FIG. 1 illustrates a schematic example circuit 100 for AC-AC electric power transformation. Specifically, the circuit 100 can step down an input voltage (e.g., Vs) provided by a voltage source Vin to generate an output voltage Vo that is less than the input voltage. Because the example circuit 100 performs AC-AC power transformation, both the input voltage and output voltage Vo are AC. The voltage source Vin can have a positive terminal 102 and a negative terminal 104, the negative terminal 104 being coupled to a ground pin GND. The positive terminal 102 of the voltage source Vin can be coupled to a first terminal 110 of a first inductor $L_1$. Specifically, the voltage source Vin and the first inductor $L_1$ can be coupled in series. A second terminal 112 of the first inductor $L_1$ can be coupled to a first terminal 120 of a first switch $SW_1$, such that the first $SW_1$ is coupled to the first inductor $L_1$ in series.

A second terminal 122 of the first switch $SW_1$ can be coupled to the first terminal 130 of a second switch $SW_2$. A second terminal 132 of the second switch $SW_2$ can be coupled to the ground pin GND. Further, a first capacitor $C_1$ can be coupled to the second switch $SW_2$ in parallel. Specifically, a first terminal 140 of the first capacitor $C_1$ can be coupled to the second terminal 122 of the first switch $SW_1$, which is also coupled to the first terminal 130 of the second switch $SW_2$. Accordingly, the second terminal 122 of the first switch $SW_1$, the first terminal 130 of the second switch $SW_2$, and the first terminal 140 of the first capacitor $C_1$ can share a common pin referred to as Node A.

A first terminal 150 of a second inductor $L_2$ can also be coupled to the first capacitor $C_1$, the second switch $SW_2$, and the first switch $SW_1$ at Node A. A second terminal 152 of the second inductor $L_2$ can be coupled to a first terminal 160 of a second capacitor $C_2$, which can be referred to as Node B. A second terminal 162 of the second capacitor $C_2$ can be coupled to the ground pin GND. Accordingly, a positive output terminal 170 can be coupled to Node B and a negative output terminal can be coupled to the ground pin GND, such that the output voltage Vo can be measured across the positive output terminal 170 and the negative output terminal 172.

In view of the structural features described above, the transformation of input voltage to a lesser output voltage caused by the circuit 100 is better appreciated with respect to specifications of the distinct components. Specifically, the inductors $L_1$, $L_2$ can be reactive electrical components or transmission lines that store energy in response to receiving a current. Moreover, the inductors $L_1$,$L_2$ can be power, ferrite core, toroidal, shielded, and/or high current inductors. The capacitors $C_1$,$C_2$ can also be reactive components or protective capacitors. For example, the capacitors $C_1$,$C_2$ can be ceramic capacitors, electrolytic capacitors, polymer capacitors, film capacitors, or variable capacitors. Because the capacitors $C_1$,$C_2$ and inductors $L_1$, $L_2$ are reactive, the capacitors $C_1$,$C_2$ and inductors $L_1$, $L_2$ react to varying voltage over time provided by the voltage source Vin as an AC signal.

The capacitors $C_1$, $C_2$ and inductors $L_1$, $L_2$ can also react to the switches $SW_1$,$SW_2$ which can open and close to impact current flow within the circuit 100 based on principles of converters. For example, an inductor of a buck converter is connected in series with a load, such that the inductor stores energy during an "on" phase (e.g., closed) of the switch, but releases the energy to the load during the "off" phase (e.g., open). Accordingly, an inductor acts to smooth pulsed output from the switch into more constant output current and voltage. Moreover, the capacitors $C_1$,$C_2$ can store energy during an "on" phase (e.g., closed) of the switch, and release energy to the load during the "off" phase (e.g., open). Therefore, the capacitors $C_1$,$C_2$ can act to filter noise produced by switching operations to provide a stable output.

A buck converter can include a diode (e.g., flyback diode) that provides a path for inductor current when the switch turns off, such that current can flow back to the inductor. Accordingly, the diode of a buck converter can provide a path for inductor current, prevent voltage spikes, and ensure unidirectional current flow in a DC-DC buck converter. The circuit 100 includes the first and second switches $SW_1$, $SW_2$ that restrict current in opposite directions, such that the switches $SW_1$, $SW_2$ can be similarly situated or replace the diode of the buck converter. Accordingly, the switches $SW_1$, $SW_2$ of the circuit can impact current flow and voltage of the circuit 100 by switching on and off. Specifically, the circuit 100 is designed similar to a DC-DC converter with a relatively higher frequency compared to 60 Hertz (Hz) by implementing the switches $SW_1$,$SW_2$ with thyristors capable relatively high switching speeds (e.g., less than millisecond). Therefore, a change of the AC signal provided by the voltage source Vin is relatively slower compared to the circuit 100 switching frequency, such that the circuit 100 can step down the entire AC signal. More specifically, when the first switch $SW_1$ is open, the second switch $SW_2$ is closed, whereas when the first switch $SW_1$ is closed, the second switch $SW_2$ is open. Thus, the first switch $SW_1$ and the second switch $SW_2$ are complementary, as the switches $SW_1$,$SW_2$ having opposing states. By employing the switches $SW_1$,$SW_2$, a duty cycle (e.g., "D") can be used to control output voltage $V_o$ to any magnitude less than or equal to the input voltage while having the same or similar frequency to the input voltage.

In an example, the input voltage or source voltage (Vs) can have a line AC voltage of 13.8 kila Volts (kV) with a frequency of 60 Hz, or approximately an angular frequency of 377 radians per second. Additionally, 13.8 kV is the root mean square (RMS) of the line AC voltage and can be converted into a peak voltage ($V_p$) by multiplying the RMS by the square root of two. Thus, the peak voltage $V_p$ provided by the voltage source $V_{in}$ can be calculated with the following expression (1):

$$Vp = 13.8\sqrt{2}\sin(377t)\text{kV} \tag{1}$$

The output voltage can be a function of the duty cycle of the first switch $SW_1$ and the peak voltage $V_p$. For example, if the first switch is always on (e.g., D=1), then the output $V_o$ can be equal to the peak voltage $V_p$. The following expression (2) can illustrate the relationship between the duty cycle, the input voltage (e.g., $V_p$), and the output voltage $V_o$. Moreover, expression (3) can be employed to calculate the output voltage $V_o$ using the duty cycle and input voltage $V_p$, and expression (4) can be employed to calculate duty cycle:

$$\frac{V_o}{V_p} = \frac{D}{2-D} \tag{2}$$

$$V_o = \frac{D}{2-D} V_p \tag{3}$$

$$D = \frac{T_{on}}{T_{total}} \tag{4}$$

wherein D is the duty cycle, $T_{total}$ is the total amount of time of a given duty cycle and $T_{on}$ is the total amount of time that the first switch $SW_1$ is on for the duration of the given duty cycle. The $T_{total}$, or total time of the duty cycle, can be based on the switching frequency of selected switches $SW_1$,$SW_2$. Thus, $V_o$ is equal to $V_p$ when the first switch $SW_1$ is always on (e.g., D=1) and $V_o$ will be when the first switch $SW_1$ is off (e.g., D=0). Therefore, the output voltage $V_o$ can have a value between zero and Vp depending on the duty cycle. Because the circuit 100 alleviates the need for traditional transformers, the circuit 100 can convert voltage (e.g., Vp) to the step down voltage (e.g., Vo) at a lower cost compared to traditional transformers.

Furthermore, the circuit 100 is a converter that is compatible with existing elements of a distribution system, such as transmission lines (e.g., inductors) and protective capacitors, further reducing the cost of power transformation and increasing utilization of distribution system elements compared to traditional power transformers. Moreover, because the switches $SW_1$,$SW_2$ can be thyristors, the current may only flow one way through the switches $SW_1$,$SW_2$. Particularly, in a traditional thyristor, current can only flow from the anode to the cathode. Accordingly, the first terminal 120 of the first switch $SW_1$ can be the anode of the first switch $SW_1$. As in a DC-DC step down converter, the second terminal 132 of the second switch $SW_2$ can be the anode, which is coupled to the ground pin GND. Thus, when either switch is on or off, both switches $SW_1$,$SW_2$ can allow current to travel to node A. The amount of current is impacted, however, by which switch $SW_1$,$SW_2$ or traditional thyristor is closed to impact the output voltage $V_o$. Instead, the thyristors implemented as the switches $SW_1$,$SW_2$ can be a bi-directional thyristor (e.g., BDT), which allows current to flow in both directions. Therefore, the switches $SW_1$,$SW_2$ can be employed to provide an output voltage $V_o$ that has a frequency that is the same or similar to the input voltage, and a magnitude that is less than or equal to the input voltage by allowing the current to flow in both directions.

Furthermore, the inductors $L_1$,$L_2$ and capacitors $C_1$,$C_2$ can be selected to improve efficacy and decrease voltage regulation of the circuit. In an example, the inductors $L_1$,$L_2$ can have an inductance of 2.5 millihenries (mH) and the capacitors $C_1$,$C_2$ can have a capacitance of 1 microFarad (uF). As previously alluded to, the switches $SW_1$,$SW_2$ can be selected as thyristors having a high switching frequency relative to the AC signal frequency, which is 60 Hz. Accordingly, the thyristors selected for the switches $SW_1$,$SW_2$ can have switching frequencies of 10 kHz, such that each switch $SW_1$, $SW_2$ can toggle more than one hundred times during a cycle of the AC input voltage signal. Stated differently, the duty cycle of the first switch $SW_1$ can be a fraction of the cycle of the AC input voltage.

Figure 2:
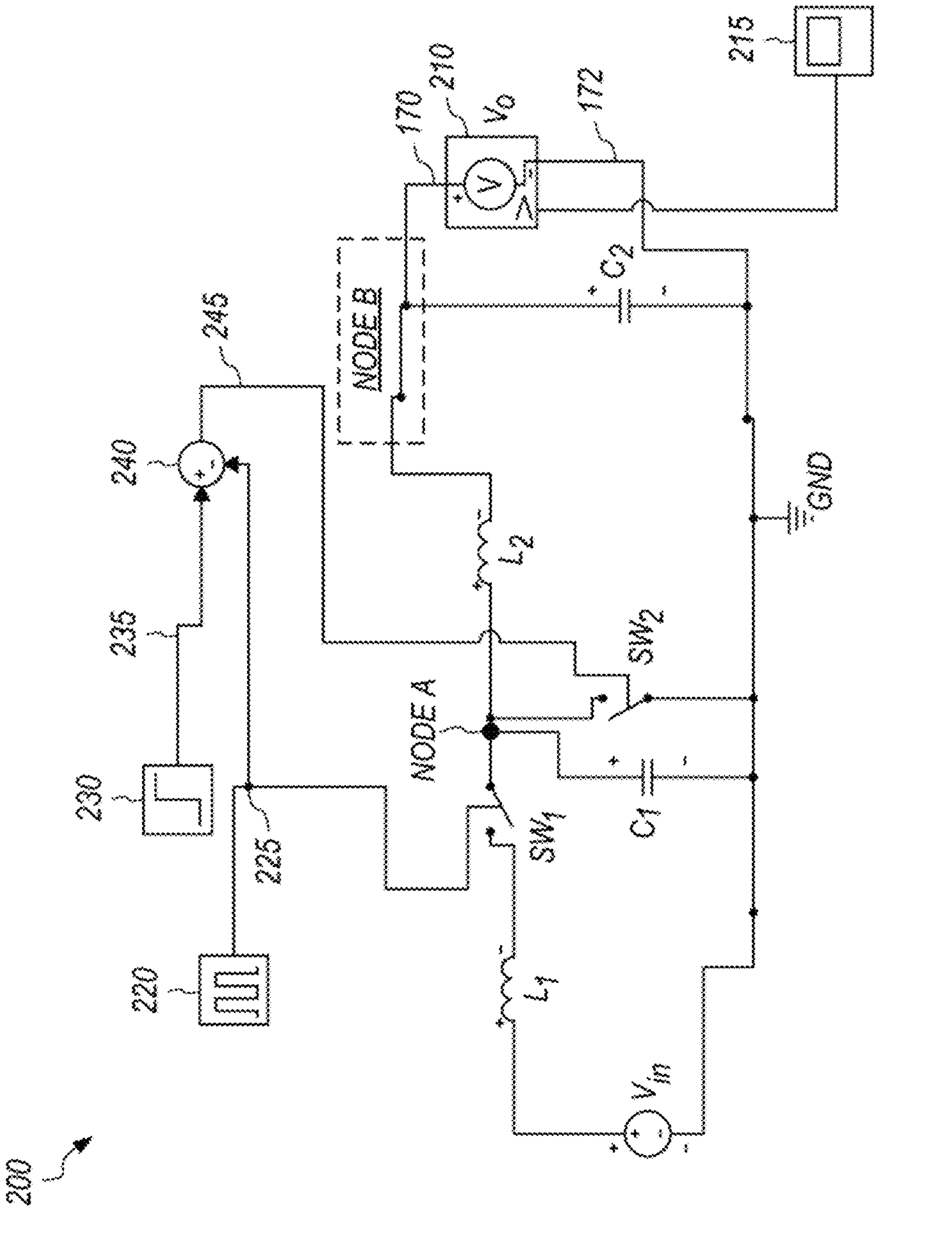
FIG. 2 is another example circuit for AC-AC electric power transformation.

FIG. 2 illustrates a model 200 of the example circuit 100 of FIG. 1. Accordingly, the model 200 can be a representation of the circuit 100 and have each of the components of the circuit 100, such as the switches $SW_1$,$SW_2$, the capacitors $C_1$, $C_2$, the inductors $L_1$, $L_2$, and the voltage source $V_{in}$. For purposes of simplification of explanation, the terminals of these respective components are not shown or described with respect FIG. 2. Additionally, FIG. 2 illustrates a probe 210, which can be coupled to the positive output terminal 170 and the negative output terminal 172 of the circuit. In some examples, the probe 210 is a load and in other examples, the probe 210 is coupled in parallel to a resistive load (not shown) of the circuit. That is the resistive load could be in parallel to the second capacitor $C_2$ coupled to Node B and the ground pin GND. In any example, the probe 210 measures the output voltage $V_o$ of the circuit 100. More specifically, the probe 210 can be coupled to an oscilloscope 215 and convey electrical signals across the positive and negative output terminals 170,172 to the oscilloscope 215. Accordingly, the oscilloscope 215 can measure the received electrical signals from the probe 210 and provide the results to a user or interface.

The model 200 can further include a first square wave generator 220. The first square wave generator 220 can be coupled to the first switch $SW_1$, or more specifically to a gate of the first $SW_1$. That is, the first square wave generator 220 can produce a first square wave 225 that can control whether the first switch $SW_1$ is closed and conducting, or is open. Specifically, if the first square wave 225 is "high" or equal to one, the gate of the first switch $SW_1$ can receive a direct current voltage, thereby operating in a closed state to allow current to flow in response. Conversely, if the first square wave 225 is "low" or equal to zero, the gate of the $SW_1$ does not receive a direct current voltage, thereby operating in an open state to disallow current to flow in response.

The model 200 can further include a second square wave generator 230. The second square wave generator 230 can produce a second square wave and be coupled to a combinator 240. Moreover, the first square wave generator 220 can also be coupled to the combinator 240, such that the combinator receives the first and second square waves 225,235. Accordingly, the combinator 240 can be coupled to the second $SW_2$, or more specifically to a gate of the second switch $SW_2$. Therefore, the combinator 240 can control whether the second $SW_2$ is open or closed. Specifically, the combinator 240 can produce a combinator signal 245 that is a function of the first and second square waves 225,235. For example, the second square wave 235 can be always high or equal to one. The combinator 240 can subtract the first square wave 225 from the second square wave 235. Therefore, when the first square wave 225 is high, the combinator signal 245 is low. Conversely, when the first square wave 225 is low, the combinator signal 245 is high. Consequently, the first and second switches $SW_1$,$SW_2$ have opposite states and switch operations based on the first square wave 225 generated by the first square wave generator 220. Because the first switch $SW_1$ can always have a state opposite the second switch $SW_2$, the first switch $SW_1$ can be configured complementary to the second switch $SW_2$.

Moreover, the second square wave 235 can be representative of $T_{total}$ shown in the fourth expression (4) representing a calculation to find the duty cycle D of the circuit 100. For purposes of simplification of explanation, the $T_{total}$ can be equal to one second. Thus, a duty cycle of D–=0.46 would require that the first switch is on for 0.46 seconds during the duty cycle, such that the first square wave 225 is high. Moreover, the total period of a waveform is based on the frequency of the waveform, and more specifically the inverse frequency of the waveform. Thus, a duty cycle D based on the frequency of 10 kHz thyristors can a have a total period $T_{total}$ of 100 microseconds. Although the second square wave 235 could maintain a high signal of one, the first square wave 225 would be required to be high or one for 46 microseconds during the duty cycle period. Accordingly, the frequency of the switches $SW_1$,$SW_2$ and corresponding duty cycle is much higher than the input voltage of 60 Hz, which is approximately 16.67 milliseconds or over one hundred times slower than the switching frequency of the switches $SW_1$,$SW_2$.

Further, the square wave generators 220,230 and combinator 240 can be digital logic components. Thus, the digital logic components can achieve high frequencies relative to the input voltage, but also reduce costs compared to traditional transformers for AC-AC transformation. For example, a 555 Timer Integrated Circuit (IC) can be used to generate a square wave, which is an easy to use, stable, and low cost IC. Similarly, oscillators, function generators, flip-flop circuits, microcontrollers, and direct digital synthesis (DDS) modules can be employed to generate square waves at high frequencies relative to 60 Hz and relatively low cost compared to traditional transformers.

Figure 3:
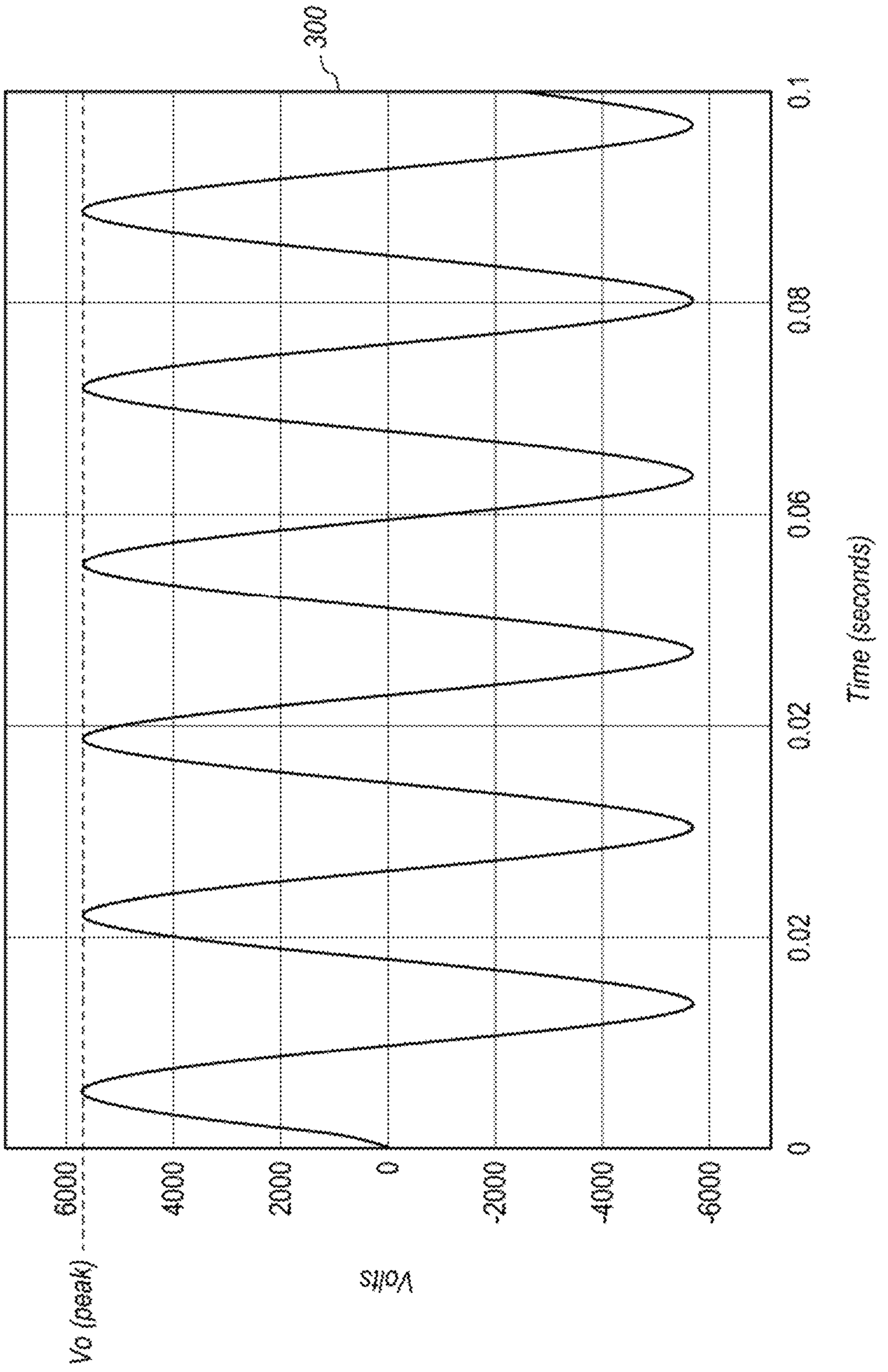
FIG. 3 is plot of output voltage of the example circuit.

Again, the output voltage $V_o$ is a function of the duty cycle D and the input voltage, such that the output voltage $V_o$ is less than or equal to the input voltage. However, as illustrated by expression (3), the output voltage $V_o$ is not directly proportional to the duty cycle. That is, a duty cycle of D=0.5 produces an output voltage $V_o$ that is about one third the input voltage based on expression (3). The factor produced by the duty cycle $$\left(\frac{D}{2-D}\right)$$

for output voltage computation in expression (3) reflects the circuit 100 configuration and principles of converters. This relationship between the duty cycle and output voltage $V_o$ is based on how the capacitors $C_1$,$C_2$ and inductors $L_1$,$L_2$ charge and discharge during the duty cycle. The frequency of input AC voltage can be 60 Hz, while the switches $SW_1$,$SW_2$ perform switching at a frequency of 10000 Hz (10 kHz). That is, the switches $SW_1$,$SW_2$ can switch at 166 cycles per AC cycle, and each switch $SW_1$,$SW_2$ can charge and discharge during a switching cycle. The charge and discharge provided by the switches $SW_1$,$SW_2$ can provide a ripple in the output voltage $V_o$, which can be a sine wave centered at the input voltage having a frequency and/or magnitude related to the switching frequency. During the switching of switches $SW_1$,$SW_2$, the output voltage $V_o$ can vary between 0-4% for each switching cycle. The variance of the output voltage $V_o$ can further be mitigated by operations and characteristics of components of the circuit 100 such as the capacitors $C_1$,$C_2$, inductors $L_1$,$L_2$, and the switches $SW_1$,$SW_2$ FIG. 3 illustrates an example output voltage waveform 300 of the circuit 100 of FIG. 1 operating with a duty cycle of 0.46 (e.g., D=0.46). Specifically, the output voltage waveform 300 of the circuit 100 can be displayed by the oscilloscope 215 of FIG. 2. Accordingly, the duty cycle of 0.46 can be implemented by the first signal generator 220 to control the switches $SW_1$,$SW_2$ of the circuit. As illustrated in FIG. 3, the output voltage waveform 300 has a peak voltage (e.g., V. (peak)). To compute the output voltage peak, expression (1) can be used. Here, the input voltage $V_p$ can be 13.8 $\sqrt{2}$ sin (377 t) kV. Because the duty cycle is D=0.46, the scalar multiplied by the input voltage $V_p$ is (0.46/1.54). Therefore, the output voltage $V_o$ (peak) is approximately 5,829.5 V. Moreover, because the output voltage $V_o$ is an AC waveform, the approximate voltage at any time (t) can computed as a function of 5829.5 sin (377 t). This example is provided for purposes of simplification of explanation, but the circuit 100 can convert input voltage to any output voltage $V_o$ less than or equal to the input voltage.

In other examples, the duty cycle provided to the first switch $SW_1$ can be zero, such that the circuit 100 is open and the output voltage $V_o$ is zero for the length of the duty cycle. In further examples, the duty cycle can be one, such that the circuit 100 is closed and the output voltage $V_o$ is equal to the input voltage for the length of the duty cycle. Accordingly, the output voltage $V_o$ can be between zero and the input voltage based on the duty cycle.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A circuit for stepping down an alternating current (AC) voltage from an input voltage to an output voltage, the circuit comprising:

an input configured to couple to a voltage source for providing the input voltage as an AC signal to the circuit, wherein the input voltage has a frequency of 60 Hz and the output voltage has a frequency of 60 Hz;

a first and a second capacitor in parallel with the input and an output, wherein the first and second capacitors have a capacitance of 1 microFarad (uF);

a first and a second inductor in series with the input and the output, wherein the first and second inductors have an inductance of an inductance of 2.5 millihenries (mH);

a first switch in series with the input and the output and a second switch, wherein the first and second switch are complementary and are thyristors that perform switching at a frequency of 10 kilohertz (kHz), such that the first switch and second switch have a total duty cycle length of 100 microseconds; and wherein the output voltage of the circuit provided to the output is an AC signal that is less than or equal to the input AC signal based on a duty cycle of the first switch, wherein the output voltage is characterized by the input voltage multiplied by $$\frac{D}{2-D},$$

D being the duty cycle of the first switch.

2. The circuit of claim 1, wherein the first and second inductors are transmission lines and the first and second capacitors are protective capacitors.

3. The circuit of claim 1, wherein the first and second inductors are power, ferrite core, toroidal, shielded, or high current inductors, and the first and second capacitors are be ceramic, electrolytic, polymer, film, or variable capacitors.

4. The circuit of claim 1, further comprising:

a first signal generator that provides a first square wave to the first switch based on the duty cycle;

a second signal generator that provides a second square wave representing the total duty cycle length to a combinator; and a combinator signal generated by the combinator that is complementary to the first square wave and is provided to the second switch.

5. A circuit for stepping down an alternating current (AC) voltage comprising:

a first input having a negative terminal coupled to a ground pin and a positive terminal coupled to a first terminal of a first inductor; wherein the first input is configured to couple to a voltage source for providing input voltage as an AC signal to the circuit;

a first switch having a first terminal coupled to a second terminal of the first inductor and a second terminal coupled to a first node;

a second switch having a first terminal coupled to the first node and a second terminal coupled to the ground pin, wherein the first switch and second switch perform switching at a frequency of 10 kilohertz (kHz), such that the first switch and second switch have a total duty cycle length of 100 microseconds;

a second inductor having a first terminal coupled to the first node and a second terminal coupled to a second node, wherein the first and second inductors have an inductance of an inductance of 2.5 millihenries (mH);

a second capacitor having a first terminal coupled to the second node and a second terminal coupled to the ground pin, wherein the first and second capacitor have a capacitance of 1 microFarad (uF);

a positive output terminal coupled to the second node; and a negative output terminal coupled to the ground pin, wherein the first and second switches are thyristors, such that the second terminal of the first switch and the first terminal of the second switch are cathodes of the respective switches that are coupled to the first node.

6. The circuit of claim 5, further comprising:

a first signal generator that provides a first square wave to a gate of the first switch based on the duty cycle;

a second signal generator that provides a second square wave representing the total duty cycle length to a combinator; and a combinator signal generated by the combinator that is complimentary complementary to the first square wave and is provided to a gate of the second switch.

7. The circuit of claim 6, wherein the output voltage across the positive output terminal and the negative output terminal is a function of the input voltage multiplied by $$\frac{D}{2-D},$$

wherein the input voltage has a frequency of 60 Hz and D is the duty cycle of the first switch.

8. The circuit of claim 7, wherein the capacitors are protective capacitors and the inductors are transmission lines.

* * * * *